US012749282B2

(12) United States Patent
Couleaud et al.

(10) Patent No.: US 12,749,282 B2
(45) Date of Patent: Sep. 29, 2026

(54) SYSTEMS AND METHODS FOR REAL-TIME POINT-OF-INTEREST DETECTION AND OVERLAY

(71) Applicant: Adeia Imaging LLC, San Jose, CA (US)

(72) Inventors: Jean-Yves Couleaud, Mission Viejo, CA (US); Reda Harb, Tampa, FL (US)

(73) Assignee: Adeia Imaging LLC, San Jose, CA (US)

( * ) Notice: Subject to any disclaimer, the term of this patent is extended or adjusted under 35 U.S.C. 154(b) by 106 days.

(21) Appl. No.: 18/672,469

(22) Filed: May 23, 2024

(65) Prior Publication Data

US 2025/0363687 A1 Nov. 27, 2025

(51) Int. Cl.

| | |
|---|---|
| ***G06T 11/60*** | (2026.01) |
| ***G06T 7/11*** | (2017.01) |
| ***G06V 10/25*** | (2022.01) |
| ***G06V 10/44*** | (2022.01) |

(52) U.S. Cl.

CPC ................ *G06T 11/60* (2013.01); *G06T 7/11* (2017.01); *G06V 10/25* (2022.01); *G06V 10/443* (2022.01)

(58) Field of Classification Search

CPC ........... G06T 11/60; G06T 7/11; G06V 10/25; G06V 10/443

See application file for complete search history.

(56) References Cited

U.S. PATENT DOCUMENTS

| | | | | |
|---|---|---|---|---|
| 8,914,232 | B2 | 12/2014 | Ma et al. | |
| 9,646,026 | B2 | 5/2017 | Glachant et al. | |
| 9,729,645 | B2 | 8/2017 | Coyle-Gilchrist | |
| 2009/0315995 | A1* | 12/2009 | Khosravy .............. | G01C 21/20 455/456.3 |
| 2010/0020074 | A1* | 1/2010 | Taborowski ....... | G01C 21/3837 345/420 |
| 2020/0057488 | A1* | 2/2020 | Johnson .................. | G06T 19/20 |
| 2021/0090257 | A1* | 3/2021 | Bhatia ...................... | G06F 18/22 |
| 2022/0383524 | A1* | 12/2022 | Menozzi ................. | G06F 11/00 |

FOREIGN PATENT DOCUMENTS

| | | |
|---|---|---|
| CN | 104376118 B | 2/2018 |
| CN | 110689623 B | 12/2020 |

OTHER PUBLICATIONS

Google Play, "Star Tracker—Mobile Sky Map", available online at: <https://play.google.com/store/apps/details?id=com.PYOPYO.StarTracker>, retrieved on Aug. 13, 2024, 6 pages.

IOS and iPadOS 17 Feature Availability, Some iOS and iPadOS features are not currently available in every region or language. Choose a feature below to see if it's supported in your region and language, available online at: <https://www.apple.com/ios/feature-availability/#maps-look-around>, retrieved on Aug. 13, 2024, 113 pages.

(Continued)

*Primary Examiner* — Said Broome

*Assistant Examiner* — Andrew Shin

(74) *Attorney, Agent, or Firm* — HG Law LLP

(57) ABSTRACT

A region of interest is determined based on metadata associated with an image. The region of interest is then sliced into a plurality of slices. POI information is retrieved for each respective slice. An overlay for at least one POI is then generated for display over the image.

20 Claims, 8 Drawing Sheets

(56) References Cited

OTHER PUBLICATIONS

IPhone User Guide, "Look around places in Maps on iPhone,", available online at: <https://support.apple.com/en-in/guide/iphone/iph65703a702/ios>, retrieved on Aug. 13, 2024, 2 pages.
Katie Boue, "Geotagging and Social Media in Our Modern Age of Conservation", Uncommon Path, available online at: <https://www.rei.com/blog/news/rei-presents-in-our-nature-is-photography-ruining-the-outdoors>, Aug. 2, 2019, 8 pages.

* cited by examiner

SYSTEMS AND METHODS FOR REAL-TIME POINT-OF-INTEREST DETECTION AND OVERLAY

BACKGROUND

This disclosure relates to image processing. In particular, solutions for automatic landmark detection and labeling are provided.

SUMMARY

When sharing photographic content on social media, geotagging a picture may yield significantly higher engagement. However, a geotag (i.e., metadata containing latitude and longitude as recorded by the camera or smart device when the picture was taken) does not necessarily provide a clear unambiguous indication of the point of interest present in the picture. For example, a geotag associated with a picture of the Eiffel Tower taken from the Trocadero Gardens may identify the picture as the Trocadero Gardens instead of the Eiffel Tower.

Solutions based on object recognition would detect the Eiffel Tower and label it correctly but would most likely fail to distinguish between Mount Baldy and Mount Baden Powell when given a picture of the Angeles National Forest mountain skyline. To address this issue, the majority of existing solutions rely on manually entered captions to label pictures with the location they represent. Automated solutions to identify points of interest in pictures and on-device exist in the art but are technically limited and seldom implemented. A better solution for automatic landmark labeling could be a competitive advantage for both manufacturers and social media platforms.

Provided herein is a method to overlay point of interest information on a picture, either on a live view on a camera or a smartphone or as an a-posteriori service once an image has been uploaded to a server associated with a service, such as a social media platform, to be shared with others, or added to a picture library management tool (e.g., Adobe® Lightroom®). The method may be limited to the outdoors outside of cities for wide angle shots showing horizon lines. For example, the method may be able to identify mountain ranges, cities and lakes, coastlines, etc., but might not be able to identify a unique tree like General Sherman.

The method first detects the location at which a picture is being taken, as well as the direction the camera is pointing. The picture is filtered using saliency or edge detection filters to extract multiple horizon lines. A section of a topographical map is derived from the location and orientation information, as well as from current camera settings such as focal length. The topographical map is used to extract a series of topographic profiles at various distances from the camera location from that portion of the map. The various topographic profiles are then matched with the horizon lines and associated point of interests are determined and overlayed on the original picture. In addition, once landmarks and other points of interest have been identified, the data generated may be used to enhance virtual walkthrough applications such as Apple's "Look Around" feature.

In general, the existing art requires a set of pictures in a database that have been linked to a point of interest or landmark to perform a match. The method described herein does not have this limitation and hence is significantly advantageous in situations where no collection of pictures exists such as in the outdoors especially in remote locations.

One existing method to record points of interest first generates a panorama at a location by taking multiple shots and correlates points of interest in a database with features captured in the panorama. Pattern matching is used to match the panorama with image templates of points of interest. Another existing method overlays points of interest and landmarks indicators onto a scene used for navigation in an augmented reality (AR) display. However, it relies on images of landmarks recorded in a database to identify the points of interest. The advantage of the solution described in this disclosure is that it does not require pre-existing pictures of the scenery captured by the device to perform landmark identification.

Systems and methods are described herein for providing POI information overlayed on an image. A region of interest is determined based on metadata associated with the image. The region of interest is then sliced into a plurality of slices. For example, the region may be sliced at incremental distances from the position at which the image was captured. The distances at which the region of interest is sliced may be fixed or may be based on geographical or topographical features within the region of interest. POI information is retrieved for each respective slice. For example, a POI database may be searched for any entries located within the area covered by each slice of the region of interest. An overlay for at least one POI is then generated for display over the image. As used herein, an overlay may be any graphical element, including a graphical user interface element, that is placed over at least a portion of an image or another user interface element already being displayed and in which POI information may displayed.

In some implementations, the image is a live image captured using a camera. In other implementations, the image is a previously captured image retrieved from a photo library or publicly available image database.

In some embodiments, a plurality of horizon lines are identified within the image. The region of interest may be further based on the horizon lines. Each slice may correspond to a respective horizon line of the plurality of horizon lines. Identifying a plurality of horizon lines in the image may comprise processing the image using one or more image processing techniques, such as edge detection, saliency filters, or semantic segmentation. Horizontal features of the image are then isolated as horizon line candidates. A horizontal feature need not be perfectly horizontal. A nearly horizontal feature, such as the profile of a mountain range, may be identified and isolated as a horizon line candidate.

In some implementations, an input may be received associated with displayed POI information. Additional information for that POI may be generated for display in response. An option to view 360-degree content associated with the POI may also be displayed. Continuity data (e.g., "look around" data) may also be retrieved for each POI. A portion of the continuity data may be mapped to the image. An option to view the continuity data may be generated for display as well. An interactive image based on the continuity data may then be displayed in response to selection of the option. In some implementations, the option may be accessed by long-pressing the portion of the image indicated by the POI information or the POI information itself.

In some embodiments, geographical information associated with the image is determined based on the metadata associated with the image. Topographical information related to the geographical information is then retrieved. This information may then be used in retrieving POI information for each slice. For example, each slice may be compared with the topographical information and a geographical region associated with each respective slice may be identified based on this comparison.

A POI may also be used as a search term to retrieve images of that POI. Information identifying the POI may be received as a search term. Images in a photo library or publicly available image database may be processed in a similar manner as described above to determine whether the POI is depicted in any of the available images. If so, those images are returned as search results.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
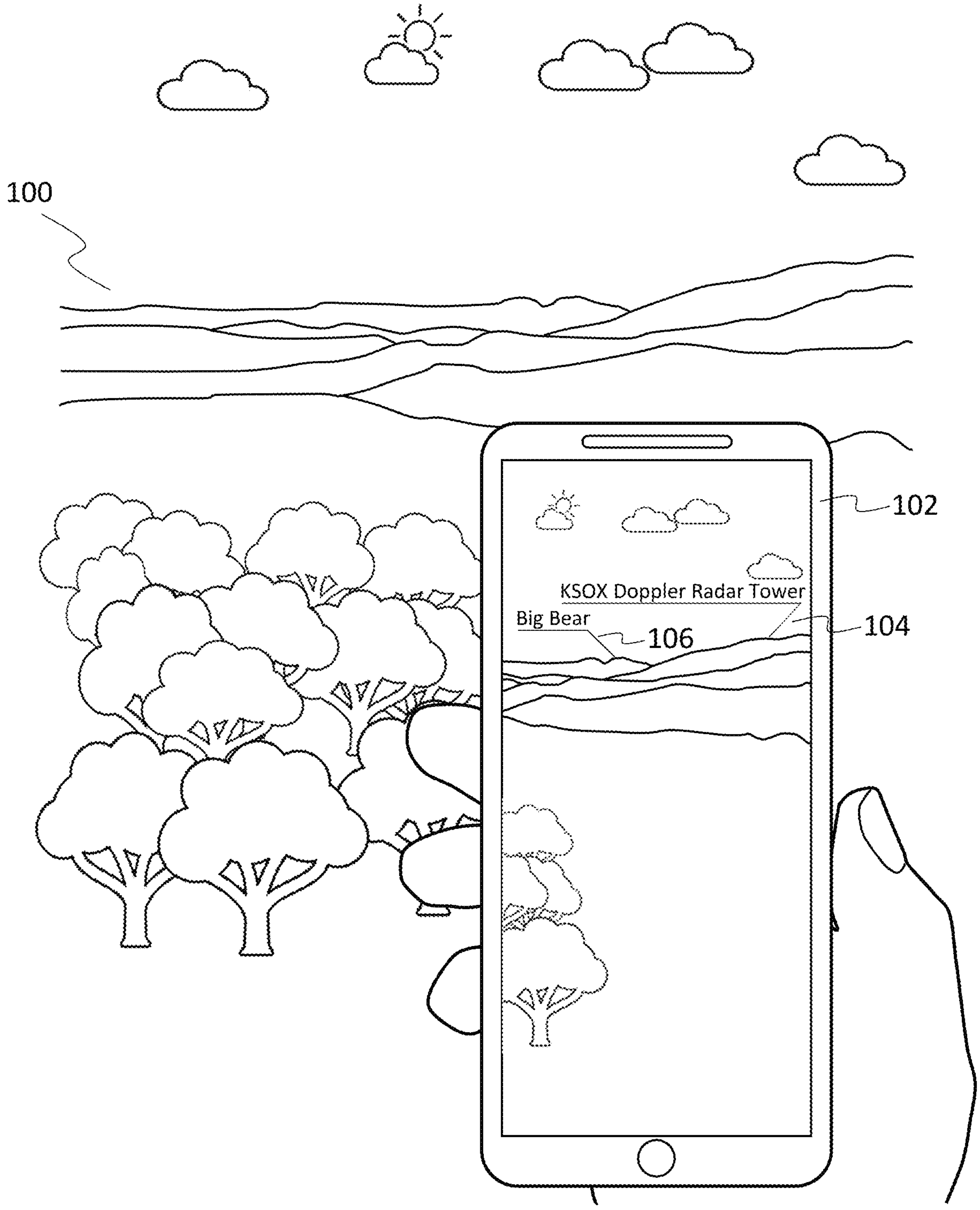
FIG. 1 shows an illustrative example of POI detection and overlay, in accordance with some embodiments of the disclosure.

The systems and methods described in this disclosure are able to annotate a picture with points of interests that have been automatically detected, either on-device or once the image is post processed such as when it is uploaded to a sharing service such as a social media platform. The end result of these systems and methods is summarized in FIG. 1. A large-scale feature, such as mountains 100, may be captured in an image. In some embodiments, an image capture device such as a camera or a smartphone 102 may be fitted with a geolocation sensor such as a GPS receiver and may be able to detect its location within a few meters in all three dimensions (latitude, longitude, altitude). Such device may also access a topographical map of its surroundings up to a few tens of kilometers. The topographical map may either be on-device (i.e., it is stored locally on the device and does not require access to the internet) or may be cloud-hosted but accessible to the device through a network connection. Based on the captured image and the topographical map, POIs may be identified. Information relating to the POIs, such as the name of each POI, may then be overlayed (104, 106) on the image.

Figure 2:
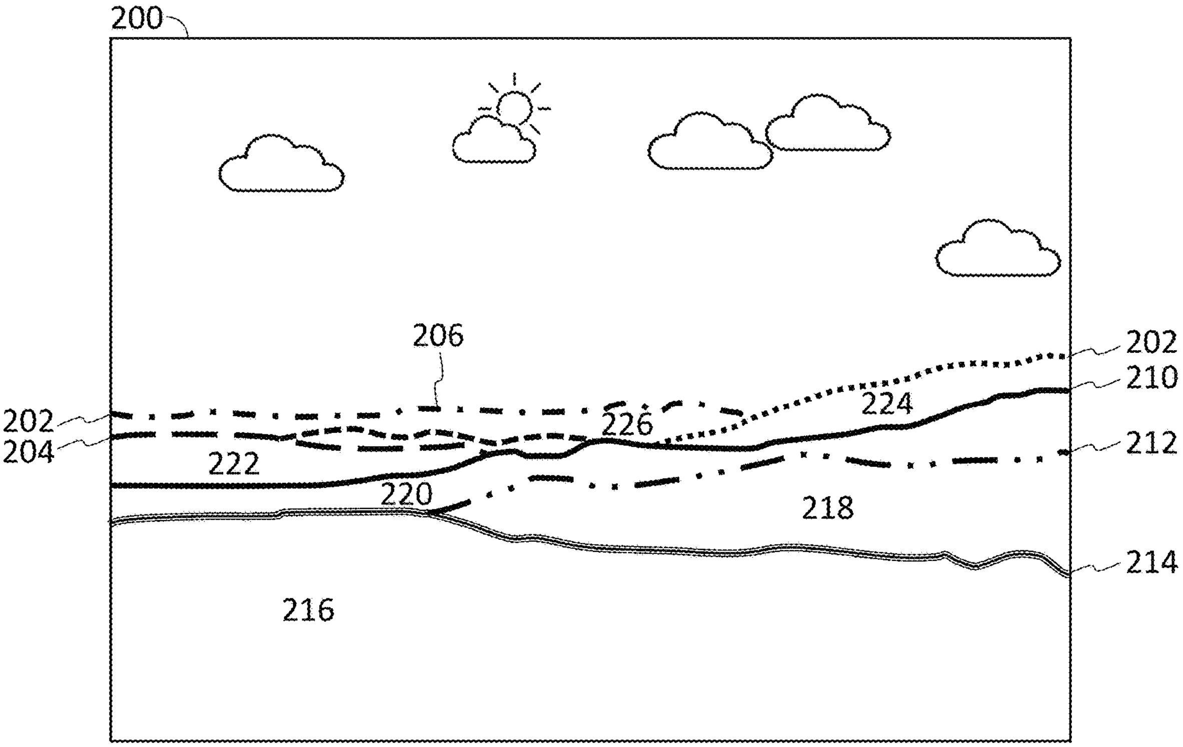
FIG. 2 shows an illustrative example of horizon line detection, in accordance with some embodiments of the disclosure.

To detect and identify POIs, the device may apply a saliency or edge detection filter onto the image to isolate horizon lines. As shown in FIG. 2, image 200 may be processed using one of these filters to identify horizon lines 202, 204, 206, 208, 210, 212, and 214. The device may also identify zones 216, 218, 220, 222, 224, and 226 bounded by the horizon lines.

Figure 3:
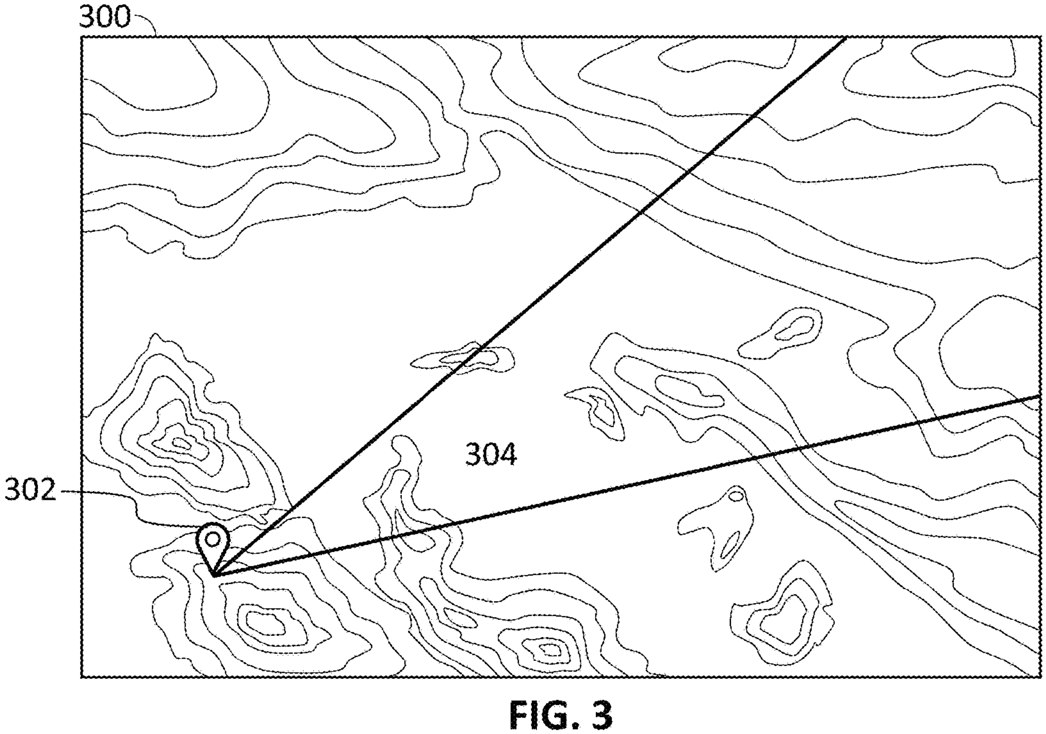
FIG. 3 shows an illustrative example of a region of interest identified based on the location from which an image was captured, in accordance with some embodiments of the disclosure.

FIG. 3 shows an illustrative example of a region of interest identified based on the location from which an image was captured, in accordance with some embodiments of the disclosure. The device may be fitted with an orientation sensor such as a tilt sensor or a geo-magnetic sensor and the likes. Based on the recorded location 302 of the device and its detected orientation, the device may then select a portion of the topographic map 300 of its surroundings as a region of interest 304. That portion may be informed by the focal length of the lens it is using, the level of digital zoom it is setup for and optionally the reported visibility at the location if available. In some examples, to save on processing power and battery life, the device may first attempt to detect the presence of one or more horizon lines in the live view prior to attempting to determine a region of interest. The device may then proceed with creating "slices" of elevation profiles perpendicular to a bisector of the portion of interest, as shown in FIG. 4.

Figure 4:
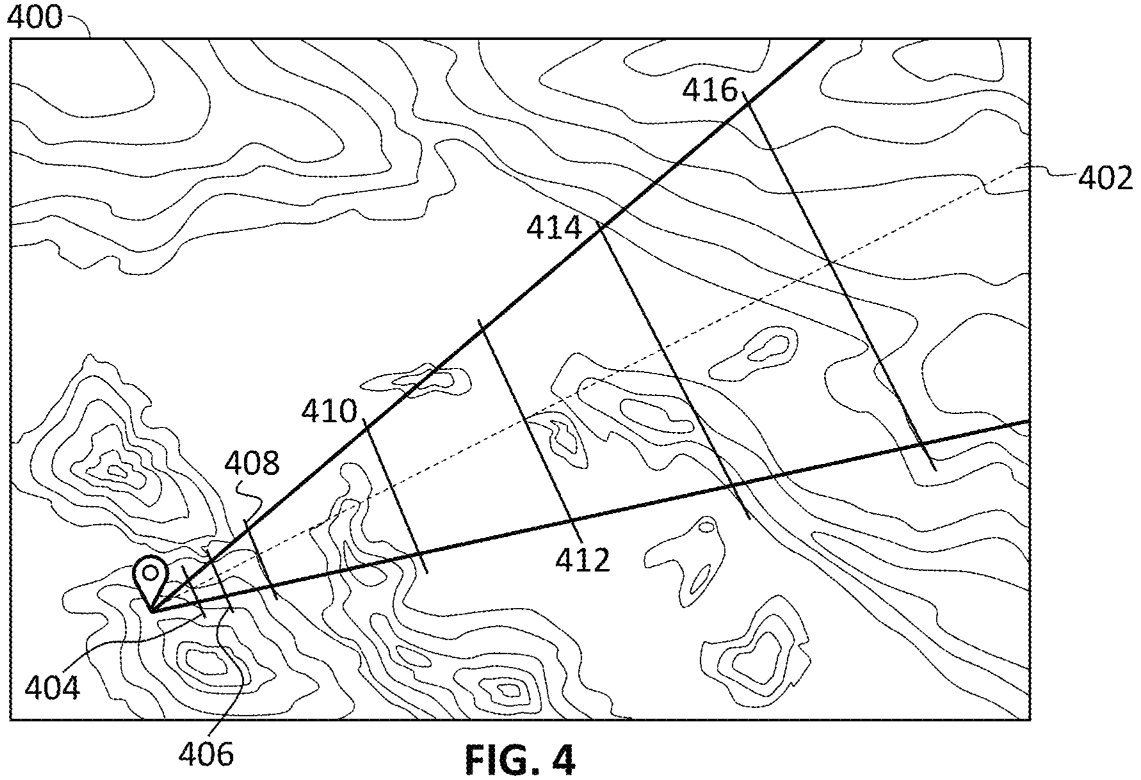
FIG. 4 shows an illustrative example of slicing a region of interest, in accordance with some embodiments of the disclosure.

FIG. 4 shows an illustrative example of slicing a region of interest, in accordance with some embodiments of the disclosure. The distribution of various elevation profiles may be based on the variation of elevation along a bisector 402 of the region of interest. The topographical map 400 may contain more slices when elevation varies significantly and may contain fewer slices when the topography of the terrain is mainly flat. The density of the distribution of the elevation profiles may also vary based on the distance of the elevation profile from the point of origin of the photograph. In some embodiments, the device may extract more elevation profiles closer to the camera and fewer elevation profiles as distance increases. This is to account for the fact that horizon lines closer to the camera will be more visible than horizon lines further from the camera. In the example of FIG. 4, the device creates seven slices 404, 406, 408, 410, 412, 414, and 416 for the region of interest. The selected positions for the slices may be based on local maximum elevation detected within the portion of interest. The selected locations for slicing may include mountain peaks as opposed to their slopes. The device may also attempt to position the slices where they intersect with point of interest referenced in the topographic map.

Upon selection of the various elevation slices, the device may then generate horizon line representations in a 2D space and map them to the horizon lines it has detected in the original picture. It may then proceed to extract points of interest that intersect the selected mapped slices and overlay them on the original picture.

In some embodiments, the device orientation or the visibility distance may not be available. Instead, the device may generate a series of slices of varied radius in a circle around the location at which the image was captured. The process may be iterative and start generating large slices of short distances and increase the distance and reduce the size of the slices. A slice size is given here by its angular section. For example, the device may start by splitting the 360-degree map into four quadrants (90-degree slices) then eight (45 degrees), etc.

Figure 5:
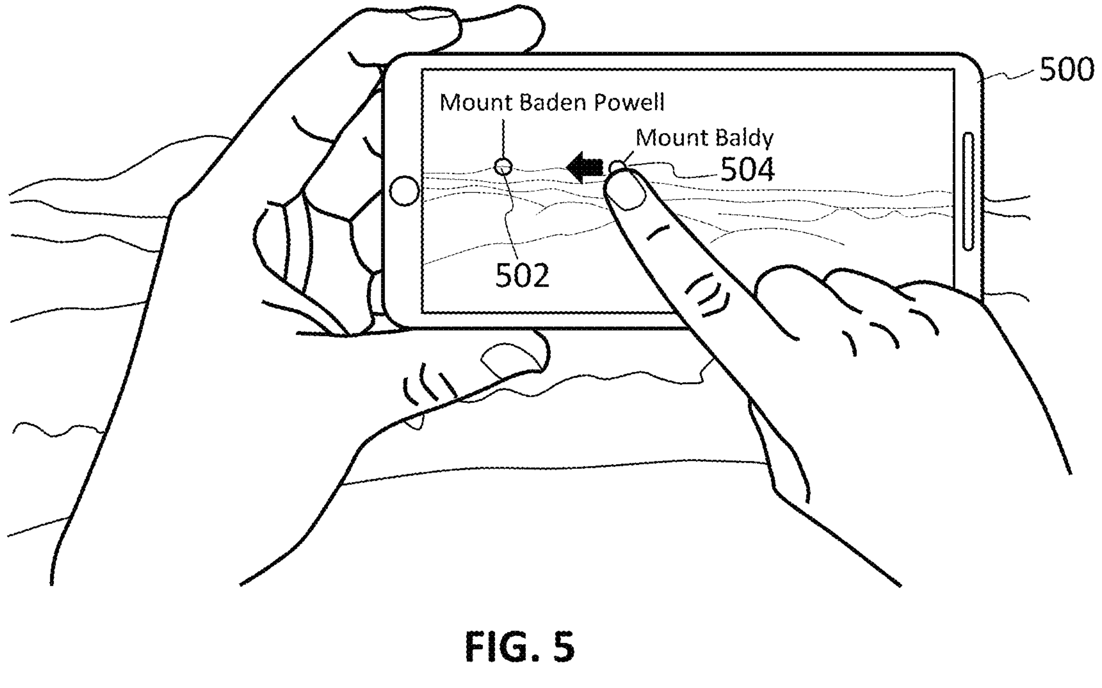
FIG. 5 shows an illustrative example of a user input to reposition a detected POI, in accordance with some embodiments of the disclosure.

In some embodiments, the tags identifying the detected POIs may be shown live to a user on the device (e.g., smartphone or digital camera) and the device may allow them to be validated by the user. FIG. 5 shows an illustrative example of a user input to reposition a detected POI, in accordance with some embodiments of the disclosure. In some examples, the device may allow an anchor point to be moved around to correct an improper positioning or associate it with different portions or objects in the live view so that it is automatically saved when the image is captured and associated with the saved image. Device 500 may display an image or live view of the region of interest with tags 502 and 504 overlayed on the image identifying two POIs. The user may select a tag by, for example, touching it with their finger on a touchscreen display, and drag the tag to a different position in the image.

Similar methods to those described above may be applied, in addition or in combination with the method above, to identify coastlines. Instead of matching horizon lines to an elevation profile, a coastline may be detected in the image or live view and projected onto a 2D horizontal plane. A contour of the coastline is obtained and compared to a geographical map (which may or may not be topographical map). Aerial pictures of the location need not have been previously captured for the matching process to occur.

In an example, once a topographic map profile has been matched to one of the elevation profiles or horizon lines extracted from the image (which may be a live view), the extracted contour can be overlayed in addition to the POI information in order to enhance the image or live view. Illustratively, the far mountain range shown in FIG. 2 may not be clearly visible and overlaying the topographic horizon lines may improve the clarity or readability of the image. In another example, when a user zooms in, the contour can be overlayed to provide better contour resolution, as the image or live view itself becomes blurrier.

In another embodiment, the identified landmarks or other POIs may be used to trigger a landmark based navigation feature such as Apple's "Look Around" feature. The image or live view may have associated tags, including geotags (i.e., geolocation data), POI identifiers, or other metadata, that may be extracted for use by the landmark based navigation feature. The tags extracted from the image or live view may be transmitted to the navigation feature of the map application and/or deep-linked to the existing landmark-based navigation data. For example, metadata contained in the extracted tags may be used as an input to a search query to a content database associated with the landmark based navigation feature. The metadata may also be used to construct an API call to the landmark based navigation feature in order to invoke presentation of content associated with the POI. Other parameters may be extracted or derived from the metadata contained in the tags, such as how much content (e.g., content for up to a specific distance from the POI) should be retrieved by the landmark based navigation feature. In this manner, when the user transitions to a navigation application, the navigation application data is enriched with the landmark-based navigation data, even though no detailed data may be available at that location through the navigation application's database.

In the previous example above, the captured image or live view may be mapped to the landmark-based navigation data (associated with the location of the image), and offer a "continuity" feature, meaning the picture that was just taken of the mountain range can be automatically deep-linked to the various peaks' landmark-based navigation data that is available. Rather than simply retrieving available supplemental or additional data about the location, a virtual walkthrough may be provided by using the captured image as a reference to supplement the existing image so that users can "see more" of the image or a natural extension of the image. For example, if the captured image shows one mountain range and a user wants to see what the environment beyond that range looks like, the extracted metadata can be used to query the landmark-based navigation data to automatically find that range and provide the virtual walkthrough. Other applications may be queried using the same key such as Google Earth to provide an augmented visualization of the captured scenery. In another example, once a series of remote landmarks have been identified, supplemental content associated with these landmarks can also be downloaded. Illustratively, the social media account of the user can be used to access information about these landmarks and provide recommendations for a picture of one of them. For example, for a live view where both Mount Baldy and Mount Baden Powell are present, a recommendation may be presented to the user to take a picture centered on Mount Baldy because it is more popular than Mount Baden Powell based on data retrieved from the social media network. Note that the device is not mapping an image to another image, it is using metadata extracted from the live view image to identify supplemental content in a database of mapped landmarks and surrounding areas. This is important because the live image may be significantly different than the images stored for the landmark-based navigation feature as they may, for example, be taken from different angles, different locations, different zoom levels, under different environmental conditions, etc. It is also important to notice that the location information provided by the GPS may not be sufficient to identify a landmark as they may be miles away from where capture device is located such as in the mountain example of FIG. 2.

In one embodiment, a user may download landmark-based navigation data for use when offline. Current mapping applications do allow their user to download this type of information for use when connectivity is spotty such as when hiking in the wilderness. In that case, the "continuity" feature may start from the content depicted in the captured image and may allow the user to navigate in any direction up to a certain distance. This means when an image is captured, this continuity data is automatically identified, stored and associated with the captured image. If multiple images were taken in or around the same location (perhaps at different orientations, zoom levels, etc.) then this information may be used to update the landmark-based navigation offline data file and insert different bookmarks within it for the different images. Once connectivity is re-established, the new data can be uploaded to a cloud server with the different images and further enrich the landmark-based navigation database. In some examples, the enriched look around data is only available to the user who originally captured the extra images, allowing the look around feature to be customized to that particular user by inserting their own images into the virtual walkthroughs.

In one embodiment, landmark-based navigation options may be enabled on the whole photo library or on specific images or specific classes or images (e.g., nature, pictures taken in France, etc.). In certain cases, the images captured by a device may not have been previously tagged with landmark identification. In that case, providing that location metadata is included with the pictures, the method described above may be used a posteriori to generate landmark identifiers.

Figure 6:
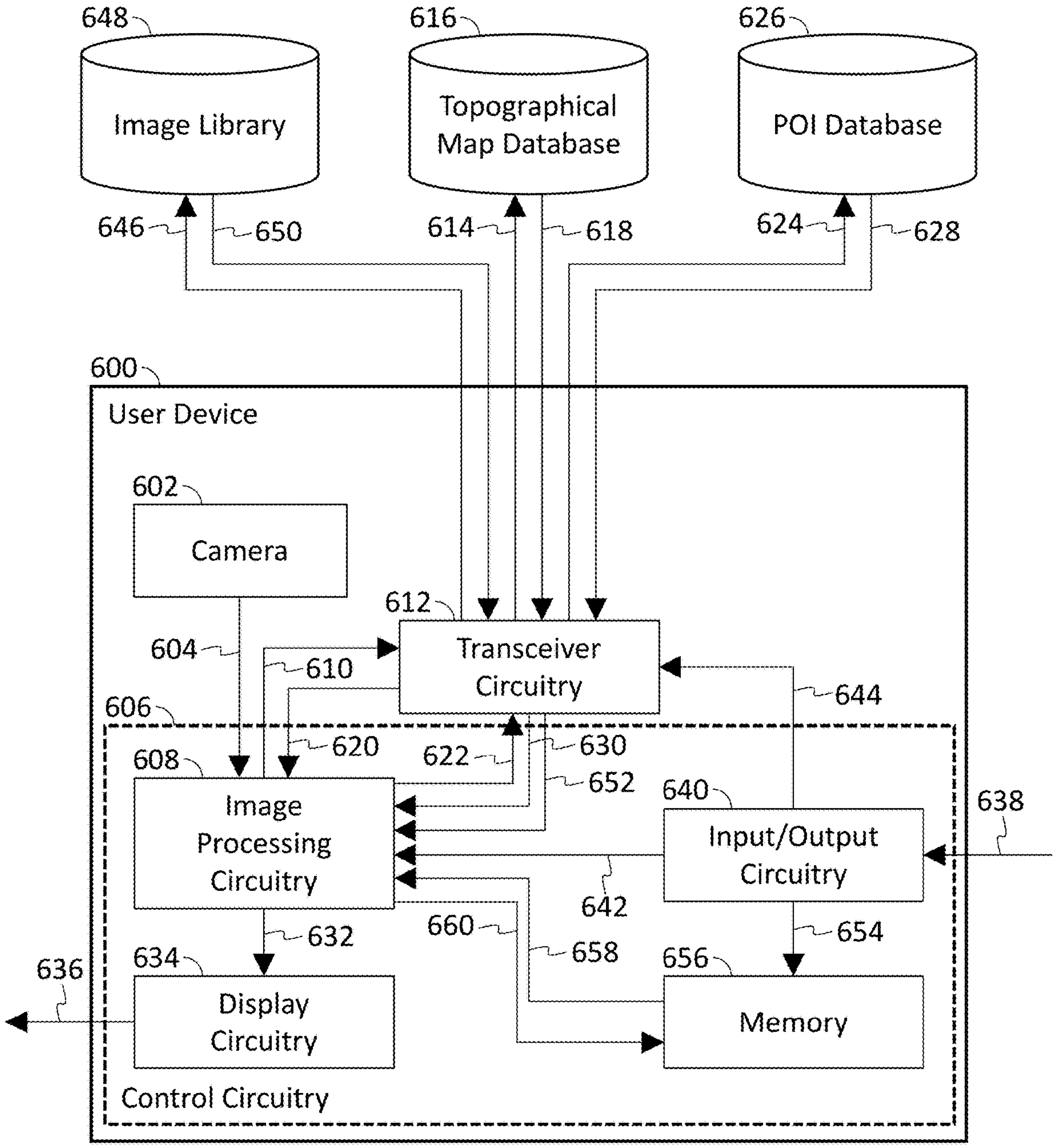
FIG. 6 is a block diagram showing components and dataflow therebetween of a system for real-time POI detection and overly, in accordance with some embodiments of the disclosure.

FIG. 6 is a block diagram showing components and dataflow therebetween of a system for real-time POI detection and overlay, in accordance with some embodiments of the disclosure. Since many of the embodiments described herein relate to the processing of images (stored or live captured) of a user's surroundings, references to user device 600 may assume user device 600 to be a smartphone (e.g., user device 102), tablet, AR display device, or any other suitable mobile device. In some implementations, the user device may be a digital camera, such as a DSLR, that has some communications connectivity, either with a network such as the Internet, or with another device (e.g., using Bluetooth or other suitable short-range communication protocols) to enable network access. However, as some embodiments relate to the processing of stored images, either locally or on a cloud-based storage service (e.g., Google Drive, Apple iCloud, etc.), it is possible that the actions described below may be performed using a personal computer, laptop, or other computing device.

In some embodiments, user device 600 captures an image of the user's surroundings using camera 602. Camera 602 may be any suitable imaging device and may be integrated with, or external to, user device 600. Camera 602 transmits 604 the captured image to control circuitry 606, where it is received using image processing circuitry 608. While referred to as a single image, transmission 604 from camera 602 may also be a stream comprising a live view of the user's surroundings. Actions described below with reference to a single image may be performed on individual frames on the live view as each frame is received in real time.

Control circuitry 606 may be based on any suitable processing circuitry and comprises control circuitry and memory circuitry, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Image processing circuitry 608 processes the image to identify a region of interest in the image. Image processing circuitry 608 may extract location data, orientation data, camera settings data, or any other metadata from the image to determine what geographical area is depicted in the image. In some embodiments, image processing circuitry 608 may identify horizon lines within the image using edge detection or saliency filters to isolate horizontal features within the image. Other suitable image processing techniques may also be used. Image processing circuitry 608 may then compare the horizon lines with topographical data to identify various POIs. For example, image processing circuitry 608 may transmit 610 a request for topographical data to transceiver circuitry 612. The request may include some or all of the extracted metadata in order to specify topographical data of interest.

Transceiver circuitry 612 may comprise a data bus connection or physical data connection port (e.g., USB). Transceiver circuitry 612 may also comprise a network connection over which data can be transmitted to and received from remote devices, such as an Ethernet connection, Wi-Fi connection, mobile broadband interface, or connection employing any other suitable network protocol. Transceiver circuitry 612 receives the request and in turn transmits 614 the request to topographical map database 616. Based on the data included in the request, topographical map database 616 retrieves topographical data for the area of interest and transmits 618 the topographical data to user device 600. The topographical data is received at transceiver circuitry 612, which in turn transmits 620 the topographical data to image processing circuitry 608. Image processing circuitry 608 may attempt to match one or more horizon lines to the topographical data. For example, image processing circuitry 608 may determine, form the metadata associated with the image, the elevation from which the image was captured and the direction and pitch angle the camera was facing. Image processing circuitry 608 may then calculate a transformation matrix for the horizon lines (or for each horizon line individually) to match the orientation of the topographical data. Image processing circuitry 608 may then compare the transformed horizon lines to the topographical data to identify any matching topographical features.

After determining the topographical features captured in the image, or simply based on metadata associated with the image, image processing circuitry 608 transmits 622 a request for POI information associated with the area depicted in the image. The request is received at transceiver circuitry 612, which in turn transmits 624 the request to POI database 626. POI database 626 may contain information about geographical landmarks, famous buildings, and other POIs. The information for each POI may include the name of the POI as well as its latitude, longitude, and altitude. Any other information, statistics, and/or images of the POI may also be included. The information for any POIs depicted in the image are then transmitted 628 from POI database 626 to user device 600 where they are received using transceiver circuitry 612. Transceiver circuitry 612 then transmits 630 the POI information to image processing circuitry 608. Image processing circuitry 608 may then determine a point within the image at which a POI is located and generate an overlay at or near the determined point identifying the POI. One or more overlays may be generated, depending on the number of POIs depicted in the image, a user preference, a popularity of each depicted POI, or any other suitable factor or combination of factors. In some implementations, the selection of slices may be based on the presence of a POI in a given slice. For example, a landmark such as a high mountain peak may be present in a region of the image. Image processing circuitry 608 may determine that the landmark is a POI and retrieve information relating to it. Image processing circuitry 608 may then generate a slice around the landmark. Thus, the selection of slices and the retrieval of POI information may occur in a linked manner, rather than as separate operations.

Image processing circuitry 608 transmits 632 the image and overlay(s) to display circuitry 634. Display circuitry 634 may be any circuitry suitable for driving a display. Display circuitry 634 then outputs 636 a display signal for display to the user on a display device, such as a display screen integrated into user device 600, an external display device, an AR or VR headset, etc.

The POI information displayed in the overlay(s) may be interactive. For example, a user may select the displayed POI information overlayed on the image to view additional information for that POI. The additional information may comprise photos, directions from the user's current location, landmark-based navigation content (e.g., "Look Around" content), etc. User device 600 may receive 638 an input from an input device, such as a touchscreen interface, keyboard, mouse, or any other suitable input device. In some embodiments, the input may be a voice input. In some embodiments, the input may be a gesture input captured with camera 602. The input is received at control circuitry 606 using input/output circuitry 640. Input/output circuitry 640 may process the received input in a manner according to the type of input received. For example, input/output circuitry 640 may transcribe a voice input to corresponding text in order to identify a command within the voice input. As another example, input/output circuitry 640 may determine a portion of the displayed image with which the user interacted with a mouse or gesture.

In some embodiments, the input may be a request or command to view additional information relating to a POI. In some embodiments, the input may be a gesture, using a touchscreen, mouse, or a hand gesture, to edit the placement of POI information. For example, the placement of a POI information overlay may obscure a feature in which the user is interested or may be placed in an incorrect location. The user may reposition the POI information by "dragging" the overlay to a different location on the image. For these types of inputs, input/output circuitry 640 transmits 642 the input or a command generated by processing the input to image processing circuitry 608. In response, image processing circuitry 608 may update the overlay position or the information being displayed in the overlay for the POI. These updates are then generated for display using display circuitry 634.

In some embodiments, the input may be a request or command to view images of a POI. This type of input may be received as a search query in which the POI is a search criterion and may be a request for publicly available images or images within the user's personal photo library. For publicly available images, input/output circuitry 640 transmits 644 the search query to transceiver circuitry 612, which in turn transmits 646 the search query to image library 648. Image library 648 may be any publicly available image database, such as Google Images or images posted to a social media network such as Facebook or Instagram.

If metadata associated with the images in image library 648 identifies POIs depicted in each image, image library 648 may simply retrieve the images whose metadata indicates the POI is depicted therein. However, in many cases, the identification of POIs depicted in an image is not included in such metadata. Instead, image library 648 may return a number of candidate images. For example, the search query may include the geolocation information for the POI in question. Image library 648 may compare the geolocation information with corresponding geolocation metadata associated with each image. An image having a geolocation that is within a threshold distance of the geolocation of the POI may be selected by image library 648 to be provided to user device 600. Image library 648 then transmits 650 the images to user device 600, where they are received using transceiver circuitry 612. Transceiver circuitry 612 then transmits 652 the images to image processing circuitry 608. For images in the user's personal photo library, input/output circuitry 640 may transmit 654 the search query to memory 656 at which the user's photos are stored. Memory 656 may be any suitable electronic storage device such as random-access memory, read-only memory, hard drives, optical drives, solid state devices, quantum storage devices, or any other suitable fixed or removable storage devices, and/or any combination of the same. Memory 656 may select images using the same techniques as described above. Memory 656 transmits 658 the selected images to image processing circuitry 608.

Image processing circuitry 608 identifies POIs depicted in each candidate image using the same techniques as described above in connection with the captured image. In some embodiments, the metadata indicating the POIs determined to be depicted in each image may be stored in association with each image. For example, image processing circuitry 608 may transmit 660 metadata indicating the POIs depicted in an image to memory 656 to be stored in association with the image in the user's personal photo library. Image processing circuitry 608 may gather the images determined to depict the POI and transmit them to display circuitry 634 to be generated for display to the user.

Figure 7:
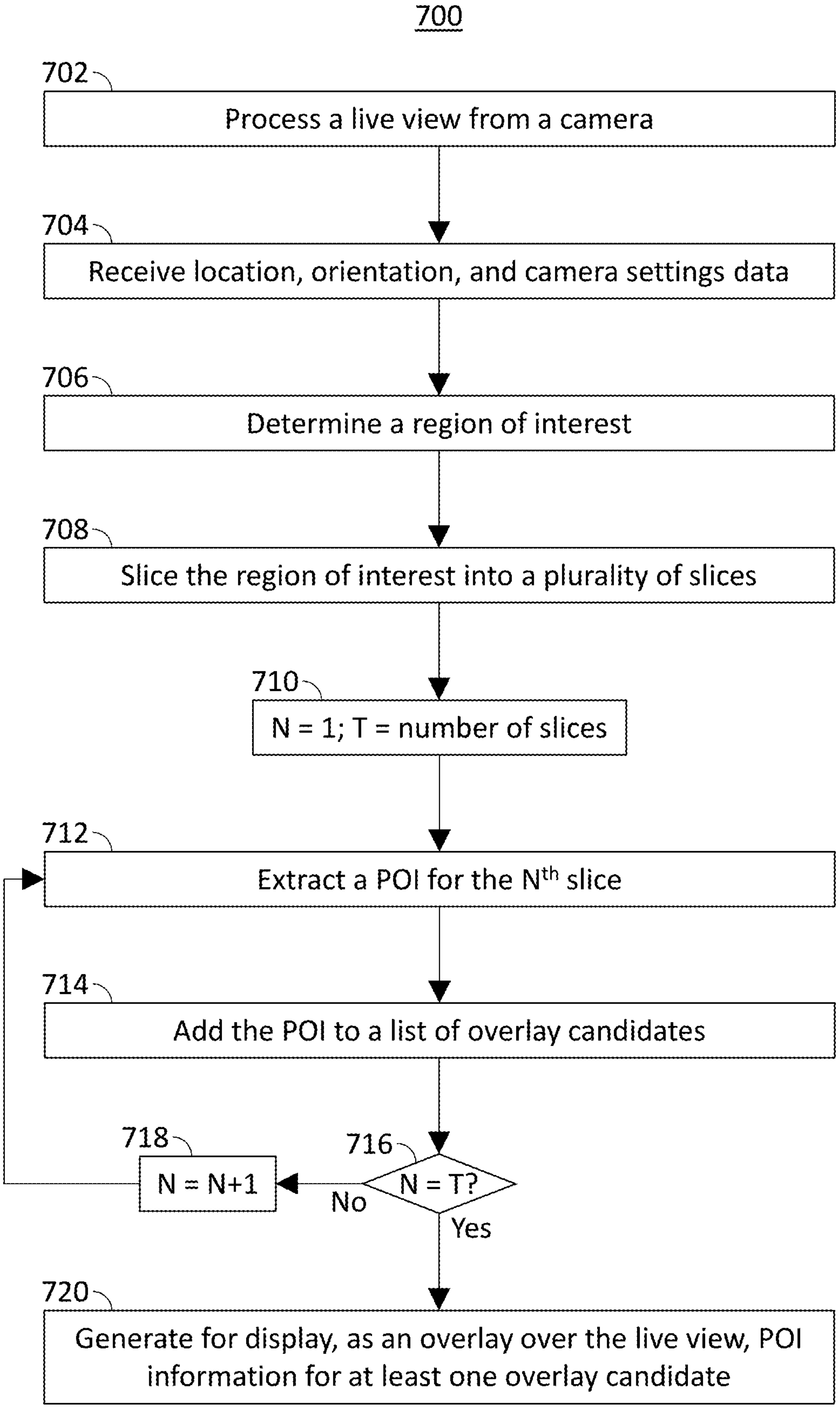
FIG. 7 is a flowchart representing an illustrative process for real-time POI detection and overlay, in accordance with some embodiments of the disclosure.

FIG. 7 is a flowchart representing an illustrative process 700 for real-time POI detection and overlay, in accordance with some embodiments of the disclosure. Process 700 may be implemented on control circuitry 606. In addition, one or more actions of process 700 may be incorporated into or combined with one or more actions of any other process or embodiment described herein.

At 702, control circuitry 606 processes a live view from a camera. For example, control circuitry 606 analyzes each frame of a live video stream received from a camera to identify features within the view of the camera. This may be accomplished using edge detection, through application of a saliency filter, or any other suitable image processing technique.

At 704, control circuitry 606 receives location, orientation, and camera settings data. For example, a current location and orientation of the camera, which may or may not be integrated into the device in which control circuitry 606 is implemented, may be received from the camera as part of the video stream. If the camera is integrated into the same device in which control circuitry 606 is implemented, control circuitry 606 may retrieve such information directly from a sensor, GPS module, or other source from which the camera may also be retrieving such information.

At 706, control circuitry 606 determine a region of interest. For example, control circuitry 606 may identify a geographic region captured in the image based on the location and altitude from which an image was captured and the orientation of the camera relative to a reference orientation (e.g., a compass bearing) and an angle at which the camera was pointing relative to a level plane. Using this information, control circuitry 606 may determine a precise geographic area captured in the image, such as a radial sector centered on the camera location and having a bisector that runs along a compass bearing corresponding to the camera orientation. Camera settings such as exposure, focal length, etc., may then be used to limit the distance from that camera included in the region of interest.

At 708, control circuitry 606 slices the region of interest into a plurality of slices. For example, control circuitry 606 may create slices based on varying elevation profiles perpendicular to the bisector of the portion of interest. The distribution of various elevation profiles may be based on the variation of elevation along the bisector of the region of interest. Control circuitry 606 may generate more slices when elevation varies significantly and may create fewer slices when the topography of the terrain is mainly flat.

At 710, control circuitry 606 initializes a counter variable N, setting its initial value to one, and a variable T representing the number of slices. At 712, control circuitry 606 extracts a POI for the $N^{th}$ slice. For example, control circuitry 606 may access a POI database and retrieve information for at least one POI contained within the geographic area covered by each slice. There any be instances in which the $N^{th}$ slice may not contain any POIs. In some implementations, control circuitry 606 may employ a sensitivity filter for identifying features within a slice as POIs. For example, control circuitry 606 may attempt to match the largest and/or most prominent features within a slice to known POIs. If there are no matching POIs among those features, control circuitry 606 may then consider smaller, less prominent features for POI matching. For example, a unnamed hill may be matched as a POI for a slice that does not contain any prominent and/or named mountain peaks.

At 714, control circuitry 606 adds the POI to a list of overlay candidates. For example, control circuitry 606 may create a temporary data structure in which POI information for a plurality of POIs may be stored.

At 716, control circuitry 606 determines whether N is equal to T, meaning that all slices have been processed. If not ("No" at 716), then, at 718, control circuitry 606 increments the value of N by one and processing returns to 712. If N is equal to T ("Yes" at 716), then, at 720, control circuitry 606 generates for display, as an overlay over the live view, POI information for at least one overlay candidate. For example, control circuitry 606 may select one POI for each slice from the plurality of overlay candidates. The selection may be based on user preference, popularity, or any other suitable metric by which POIs may be ranked. In some embodiments, the POIs corresponding to each overlay candidate are ranked against each other and only a small number of POIs (e.g., two) having the highest rank are selected to be generated for display. In other embodiments, POIs in each slice are ranked against each other and the highest ranked POI in each slice is selected to be generated for display.

The actions and descriptions of FIG. 7 may be used in any other embodiment of this disclosure. In addition, the actions and descriptions described in relation to FIG. 7 may be done in suitable alternative orders or in parallel to further the purposes of this disclosure.

Figure 8:
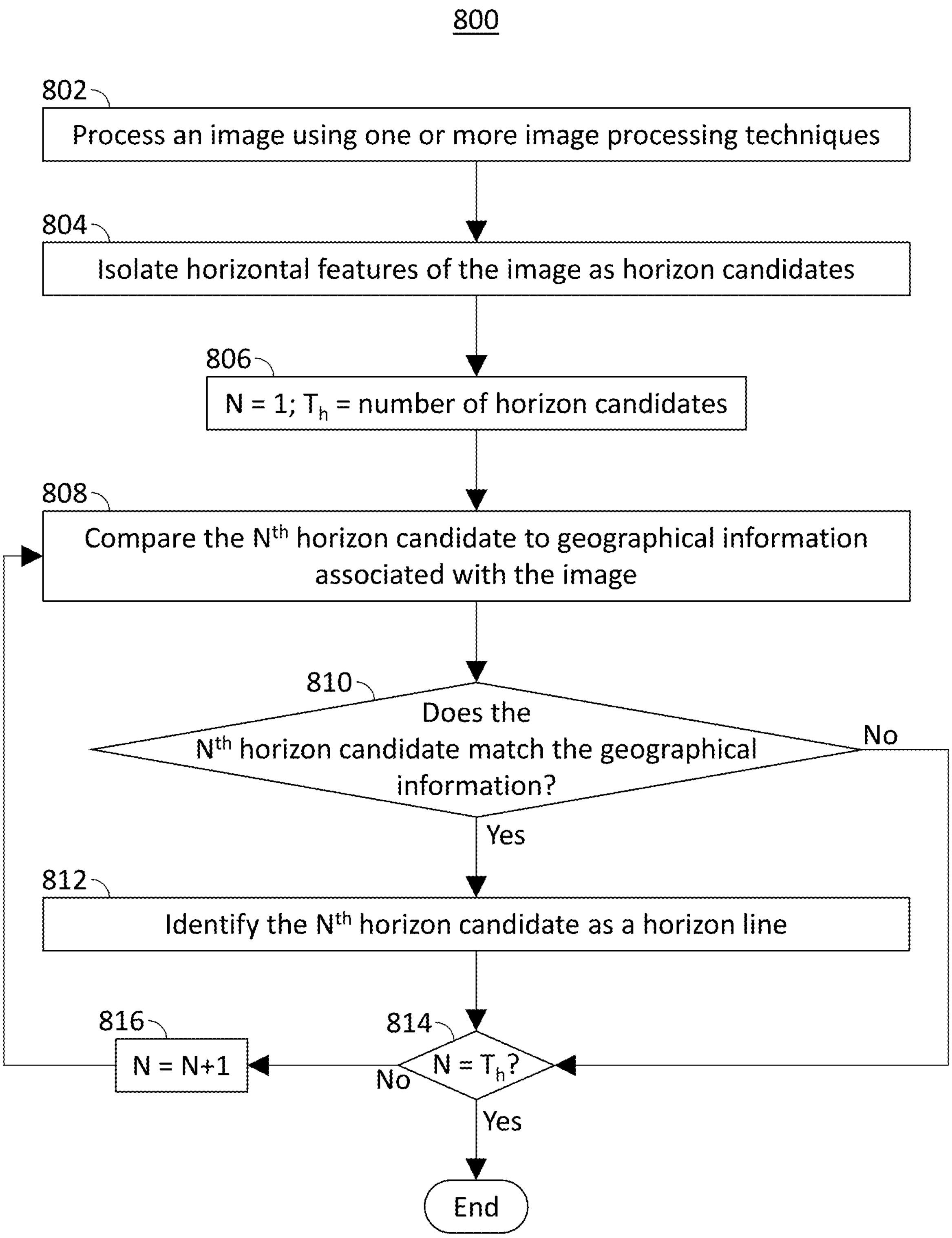
FIG. 8 is a flowchart representing an illustrative process 800 for identifying horizon lines in an image, in accordance with some embodiments of the disclosure.

FIG. 8 is a flowchart representing an illustrative process 800 for identifying horizon lines in an image, in accordance with some embodiments of the disclosure. Process 800 may be implemented on control circuitry 606. In addition, one or more actions of process 800 may be incorporated into or combined with one or more actions of any other process or embodiment described herein.

At 802, control circuitry 606 processes an image using one or more image processing techniques. For example, control circuitry 606 may process the image use edge detection to identify individual objects and other features depicted within the image. As another example, control circuitry 606 may use a saliency filter to detect and identify visually distinctive portions of the image.

At 804, control circuitry 606 isolates horizontal features of the image as horizon candidates. For example, control circuitry 606 may determine a general shape of each detected edge or visually distinctive portion of the image. If the general shape is determined to have a significant horizontal component along its uppermost border, the feature is isolated as a horizon candidate.

At 806, control circuitry 606 initializes a counter variable N, setting its initial value to one, and a variable $T_h$ representing the number of horizon candidates that have been isolated from the image. At 808, control circuitry 606 compares the $N^{th}$ horizon candidate to geographical information associated with the image. For example, control circuitry 606 may retrieve geographical and/or topographical information describing an area depicted in the image. Control circuitry 606 may transform the image such that the perspective of the image and, consequently, the horizon candidates matched the perspective offered by the geographical and/or topographical information. Alternatively, control circuitry 606 may transform the geographical and/or topographical information to match the perspective from which the image was captured. As another alternative, control circuitry 606 may transform both the image and the geographical and/or topographical information to a common perspective. Other suitable techniques for comparing the features of the image with other data may also be used. In some cases, artificial structures may obscure part of a horizon candidate as depicted in the image. Control circuitry 606 may use suitable image processing methods and/or generative AI tools to approximate the obscured part of the horizon candidate.

At 810, control circuitry 606 determines, based on the comparison, whether the $N^{th}$ horizon candidate matches the geographical information. For example, the shape of the $N^{th}$ horizon line may be compared with a geological or topographical feature in the geographical information. Based on the comparison, a correlation factor expressing a similarity between the horizon line and the geographical information may be calculated. Since the overall shape of the $N^{th}$ horizon line is considered, there may be no need for the scale of the $N^{th}$ horizon line to match the scale of the geographical information. In some implementations, a relative variation of altitude may be used as the basis for the comparison, rather than the absolute elevation of the $N^{th}$ horizon line. If the correlation factor is above a threshold, such as 95% or 0.95, control circuitry 606 may determine that the $N^{th}$ horizon line matches the geographical information. If so ("Yes" at 810), then, at 812, control circuitry 606 identifies the $N^{th}$ horizon candidate and a horizon line. After identifying the $N^{th}$ horizon candidate as a horizon line, or if the $N^{th}$ horizon candidate does not match the geographical information ("No" at 810), at 814, control circuitry 606 determines whether N is equal to $T_h$, meaning that all horizon candidates have been processed. If N is not equal to $T_h$ ("No" at 814), then, at 816, control circuitry 606 increments the value of N by one, and processing returns to 808. If N is equal to $T_h$ ("Yes" at 814), then the process ends.

The actions and descriptions of FIG. 8 may be used in any other embodiment of this disclosure. In addition, the actions and descriptions described in relation to FIG. 8 may be done in suitable alternative orders or in parallel to further the purposes of this disclosure.

Figure 9:
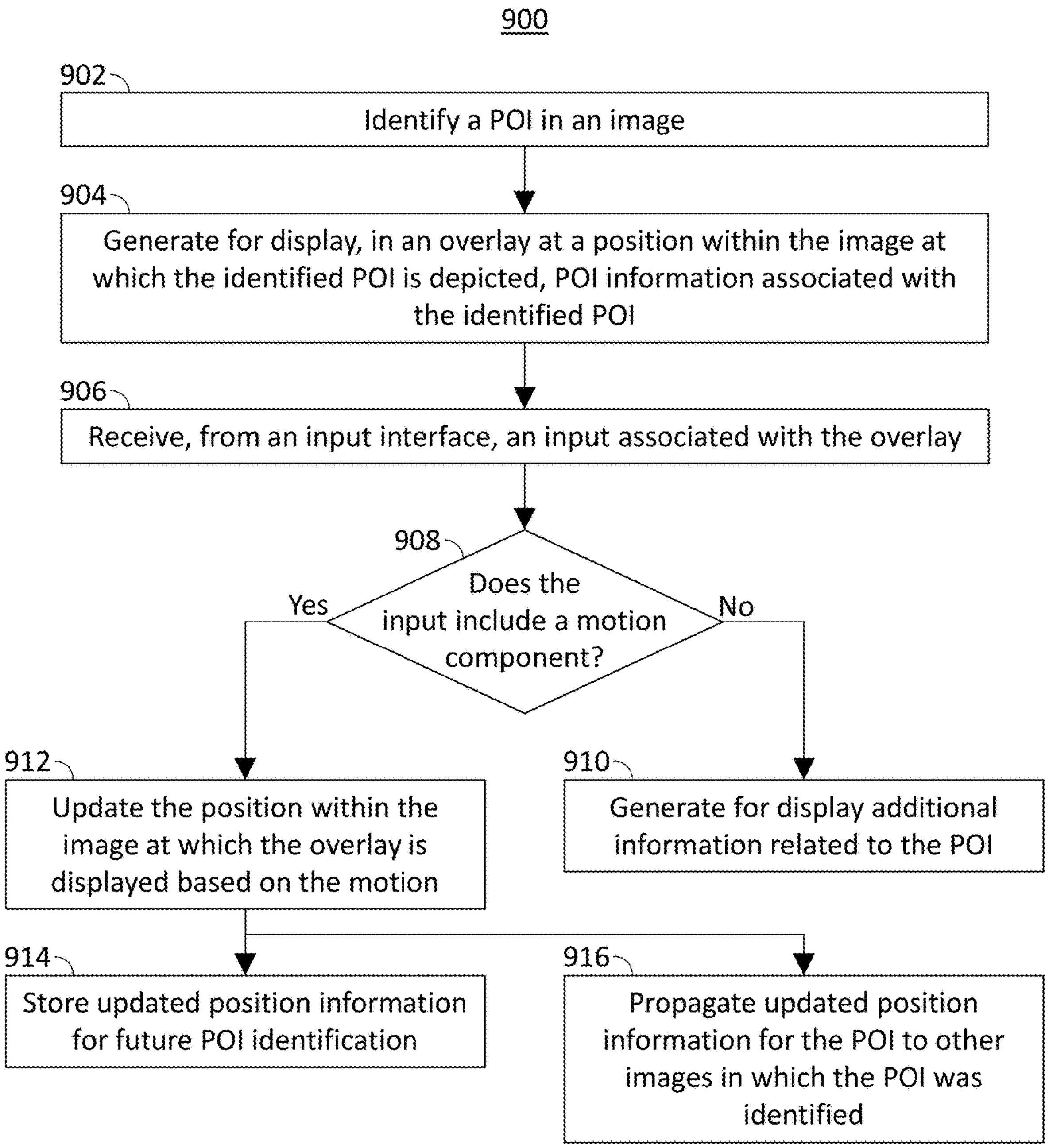
FIG. 9 is a flowchart representing an illustrative process for repositioning a detected POI, in accordance with some embodiments of the disclosure.

FIG. 9 is a flowchart representing an illustrative process 900 for repositioning a detected POI, in accordance with some embodiments of the disclosure. Process 900 may be implemented on control circuitry 606. In addition, one or more actions of process 900 may be incorporated into or combined with one or more actions of any other process or embodiment described herein.

At 902, control circuitry 606 identifies a POI in an image. For example, control circuitry 606 may determine a geographic location depicted in the image and retrieve, from a database, information describing POIs in that location. At 904, control circuitry 606 generates for display, in an overlay at a position within the image at which the identified POI is depicted, POI information associated with the identified POI. For example, control circuitry 606 may determine that the identified POI is depicted within the image at a specific pixel location or pixel coordinates. This determination may be based on a comparison of the image with geographic information associated with the POI. Control circuitry 606 may then generate an overlay including POI information to be displayed at the determined location. In some cases, the overlay may include a visual pointer or other graphical element pointing to the specific determined location.

At 906, control circuitry 606 receives, from an input interface, an input associated with the overlay. For example, the input interface may be a touchscreen on which the image and overlay are displayed. The input may be a touch interaction with the overlay. As another example, the input interface may be a mouse interface used to move a cursor over the image. The input may be a click interaction with the overlay.

At 908, control circuitry 606 determines whether the input includes a motion component. For example, control circuitry 606 may record a position associated with the input at the time at which the input is first received and a position associated with the input at a time at which the input ends. If the distance between the recorded positions exceeds a minimum threshold, control circuitry 606 may determine that the input includes a motion component. Any other suitable technique for detected a "drag" input may also be used.

If the input does not include a motion component ("No" at 908), then, at 910, control circuitry 606 may conclude that the input is a selection input and generates for display additional information related to the POI. For example, control circuitry 606 may generate for display an expanded overlay for the selected POI in which to display more POI information, associated photos, or any other information relating to the POI.

If the input does include a motion component ("Yes" at 908), then, at 912, control circuitry 606 updates the position within the image at which the overlay is displayed based on the motion. For example, control circuitry 606 may calculate the distance and direction of the motion component based on the recorded positions and adjust the position of the overlay by the same distance and in the same direction. In some embodiments, the determination of a motion component may be made before the input stops, allowing for adjustment in the position of the overlay while the input is still in progress. This allows the user to accurately see where the overlay will be placed when the input ends.

At 914, control circuitry 606 stores updated position information for future POI identification. For example, the user may reposition the overlay because it was placed in an incorrect location, identifying an incorrect feature as the POI. Control circuitry 606 may store the corrected position so that future images of the same geographic area will correctly identify the POI. In some implementations, control circuitry 606 may increment a counter for each time the location of a given POI is corrected by a user and only store the corrected position after a threshold number of corrections have been made. For example, only after five users have corrected the location of the POI will control circuitry 606 store the corrected location. In some implementations, the corrected location may be stored for each correction received. After the threshold number of corrections have been received, the location of the POI may be updated to a location that is an average of the corrected locations received. At 916, control circuitry 606 propagates the updated position information for the POI to other images in which the POI was identified. For example, control circuitry 606 may search an image library for images depicting the POI or having associated metadata indicated that the POI is depicted therein. The location information for the POI included in those images may also be updated. In some embodiments, this propagation may extend to public image databased as well.

The actions and descriptions of FIG. 9 may be used in any other embodiment of this disclosure. In addition, the actions and descriptions described in relation to FIG. 9 may be done in suitable alternative orders or in parallel to further the purposes of this disclosure.

Figure 10:
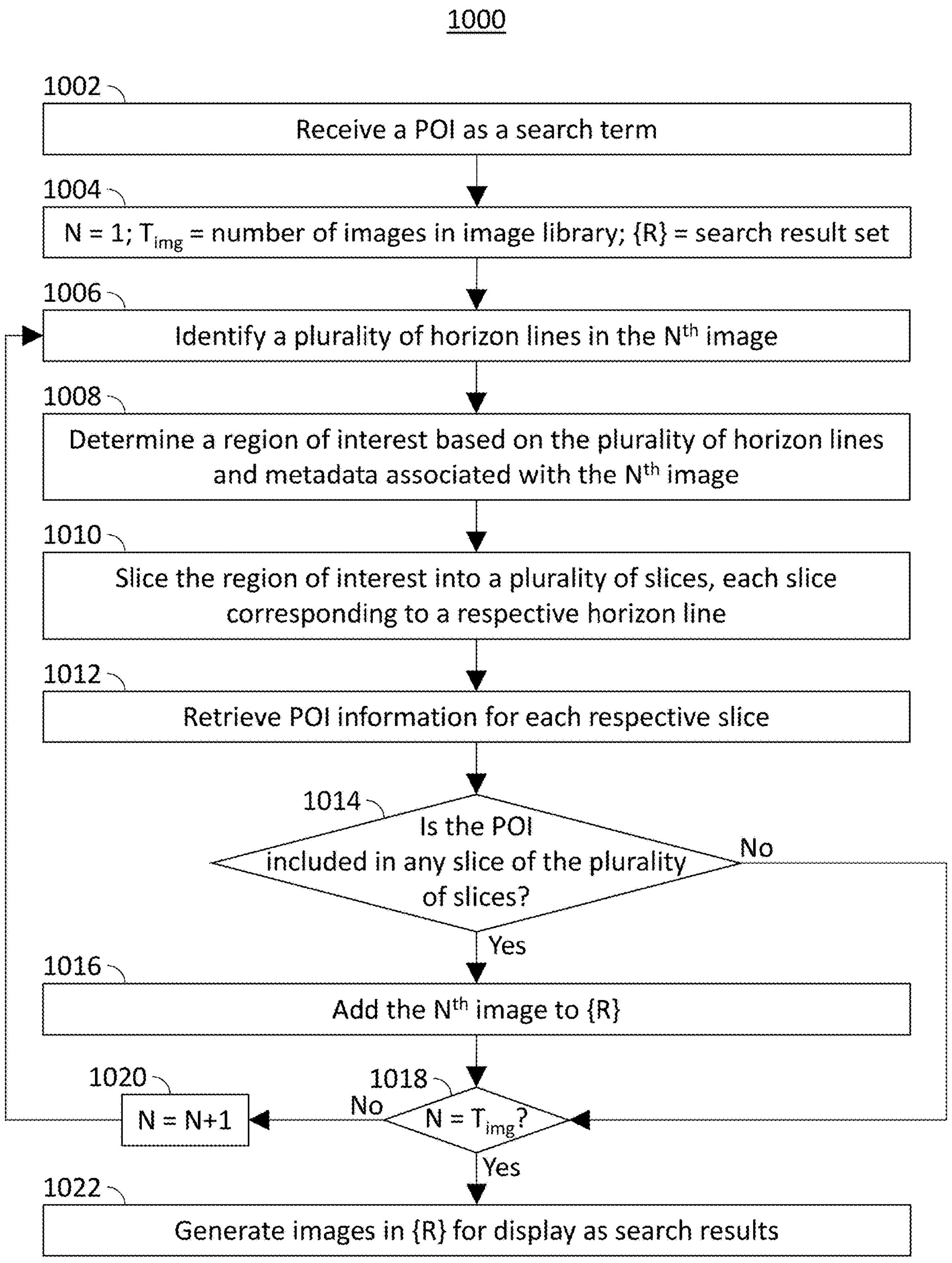
FIG. 10 is a flowchart representing an illustrative process for searching for images containing a particular POI, in accordance with some embodiments of the disclosure.

FIG. 10 is a flowchart representing an illustrative process for searching for images containing a particular POI, in accordance with some embodiments of the disclosure. Process 1000 may be implemented on control circuitry 606. In addition, one or more actions of process 1000 may be incorporated into or combined with one or more actions of any other process or embodiment described herein.

At 1002, control circuitry 606 receives a POI as a search term. For example, control circuitry 606 may receive a search query requesting images of a specific POI. The POI may be indicated in the search query by name or location. Alternatively, a "more images" function may be triggered from an image of the POI. Metadata describing the POI may be extracted from the initial image and provided as search terms in the search query.

At 1004, control circuitry 606 initializes a counter variable N, settings its initial value to one, a variable $T_{img}$ representing the number of images in an image library to be searched, and an array or other data structure {R} as a search result set. At 1006, control circuitry 606 identifies a plurality of horizon lines in the $N^{th}$ image. This may be accomplished using methods described above in connection with FIG. 8.

At 1008, control circuitry 606 determine a region of interest based on the plurality of horizon lines and metadata associated with the $N^{th}$ image. This may be accomplished used methods described above in connection with FIG. 7. At 1010, control circuitry 606 slices the region of interest into a plurality of slices, each slice corresponding to a respective horizon line. For example, because each horizon line may correspond to an elevation profile, control circuitry 606 may create slices based on based on each horizon line. The slices are made perpendicular to a bisector of the region of interest.

At 1012, control circuitry 606 retrieves POI information for each respective slice of the plurality of slices. This may be accomplished using methods described above in connection with FIG. 7. At 1014, control circuitry 606 determines whether the POI is included in any slice of the plurality of slices. For example, control circuitry 606 may compare the retrieved POI information with the POI received as a search term to determine if there is a match. If the POI is included in a slices of the plurality of slices of the $N^{th}$ image ("Yes" at 1014), then, at 1016, control circuitry 606 adds the $N^{th}$ image to {R}.

After adding the $N^{th}$ image to {R}, or if the POI is not included in the $N^{th}$ image ("No" at 1014), at 1018, control circuitry 606 determines whether N is equal to $T_{img}$, meaning that all images have been processed. If N is not equal to $T_{img}$, ("No" at 1018), then, at 1020, control circuitry 606 increments the value of N by one, and processing returns to 1006. If N is equal to $T_{img}$ ("Yes" at 1018), then, at 1022, control circuitry 606 generates images in {R} for display as search results.

The actions and descriptions of FIG. 10 may be used in any other embodiment of this disclosure. In addition, the actions and descriptions described in relation to FIG. 10 may be done in suitable alternative orders or in parallel to further the purposes of this disclosure.

The processes described above are intended to be illustrative and not limiting. One skilled in the art would appreciate that the steps of the processes described herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should be noted that the systems and/or methods described above may be applied to, or used in accordance with, other systems and/or methods.

What is claimed is:

1. A method for providing point of interest (POI) information overlayed on an image, the method comprising:
- determining a region of interest based on metadata associated with the image;
- slicing the region of interest into a plurality of slices based on a plurality of elevation profiles identified in the region of interest;
- matching features within each respective slice with known POIs;
- retrieving POI information for the matched features within each respective slice; and
- generating for display, as an overlay over the image, POI information for at least one slice of the plurality of slices.

2. The method of claim 1, wherein the image is a live image, and the method further comprising capturing the live image from a camera.

3. The method of claim 1, further comprising identifying, in the image, a plurality of horizon lines, wherein the region of interest is further based on the plurality of horizon lines, and wherein each slice of the plurality of slices corresponds to a respective horizon line of the plurality of horizon lines.

4. The method of claim 3, wherein identifying, in the image, a plurality of horizon lines comprises:
- processing the image using one or more image processing techniques; and
- isolating horizontal features of the image as horizon candidates.

5. The method of claim 1, further comprising:
- receiving an input associated with displayed POI information for a slice of the plurality of slices; and
- generating for display additional information describing the POI.

6. The method of claim 5, further comprising generating for display an option to view 360-degree content associated with the POI.

7. The method of claim 1, further comprising retrieving, based on POI information for at least one slice of the plurality of slices, continuity data associated with the image.

8. The method of claim 7, further comprising mapping a portion of the continuity data to the image.

9. The method of claim 8, further comprising generating for display an interactive image based on the image and the continuity data.

10. The method of claim 1, further comprising
- determining, based on the metadata, geographical information associated with the image; and
- retrieving topographical information related to the geographical information;
- wherein retrieving POI information for each respective slice further comprises:
  - comparing each respective slice with the topographical information; and
  - identifying, based on the comparison, a respective geographical region associated with each respective slice.

11. A system for providing point of interest (POI) information overlayed on an image, the system comprising:
- input/output circuitry; and
- control circuitry configured to:
  - determine a region of interest based on metadata associated with the image;
  - slice the region of interest into a plurality of slices based on a plurality of elevation profiles identified in the region of interest;
  - match features within each respective slice with known POIs;
  - retrieve, using the input/output circuitry, POI information for the matched features within each respective slice; and
  - generate for display, as an overlay over the image, POI information for at least one slice of the plurality of slices.

12. The system of claim 11, wherein:
- the image is a live image;
- the system further comprises imaging circuitry; and
- the control circuitry is further configured to capture the live image using the imaging circuitry.

13. The system of claim 11, wherein the control circuitry is further configured to identify, in the image, a plurality of horizon lines, wherein the region of interest is further based on the plurality of horizon lines, and wherein each slice of the plurality of slices corresponds to a respective horizon line of the plurality of horizon lines.

14. The system of claim 13, wherein the control circuitry configured to identify, in the image, a plurality of horizon lines is further configured to:
- process the image using one or more image processing techniques; and
- isolate horizontal features of the image as horizon candidates.

15. The system of claim 11, wherein the control circuitry is further configured to:
- receive an input associated with displayed POI information for a slice of the plurality of slices; and
- generate for display additional information describing the POI.

16. The system of claim 15, wherein the control circuitry is further configured to generate for display an option to view 360-degree content associated with the POI.

17. The system of claim 11, wherein the control circuitry is further configured to retrieve, using the input/output circuitry, based on POI information for at least one slice of the plurality of slices, continuity data associated with the image.

18. The system of claim 17, wherein the control circuitry is further configured to map a portion of the continuity data to the image.

19. The system of claim 18, wherein the control circuitry is further configured to generate for display an interactive image based on the image and the continuity data.

20. The system of claim 11, wherein the control circuitry configured is further configured to:

determine, based on the metadata, geographical information associated with the image; and retrieve topographical information related to the geographical information;

wherein the control circuitry configured to retrieve POI information for each respective slice is further configured to:

compare each respective slice with the topographical information; and identify, based on the comparison, a respective geographical region associated with each respective slice.

* * * * *